Patented June 20, 1933

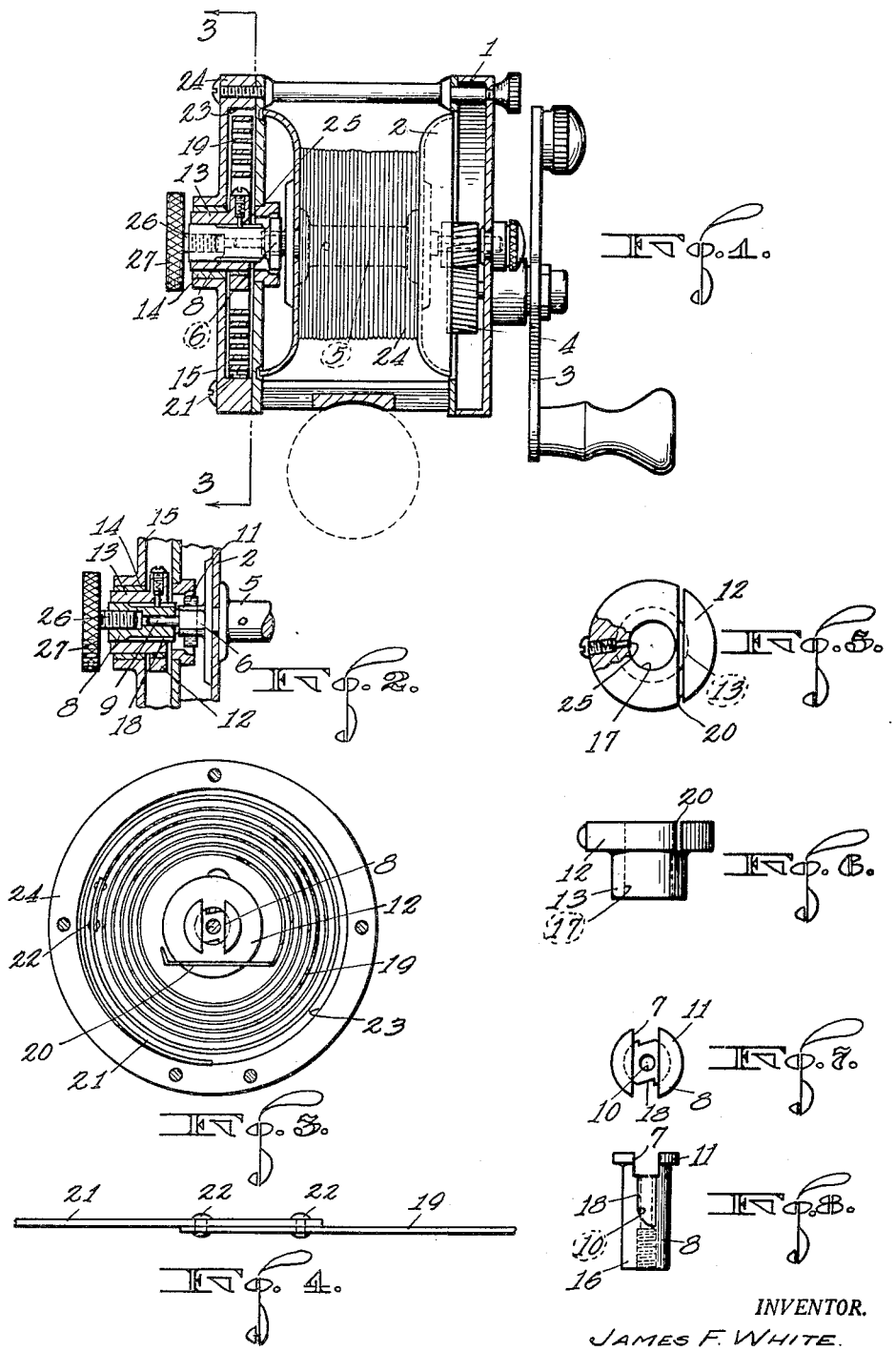

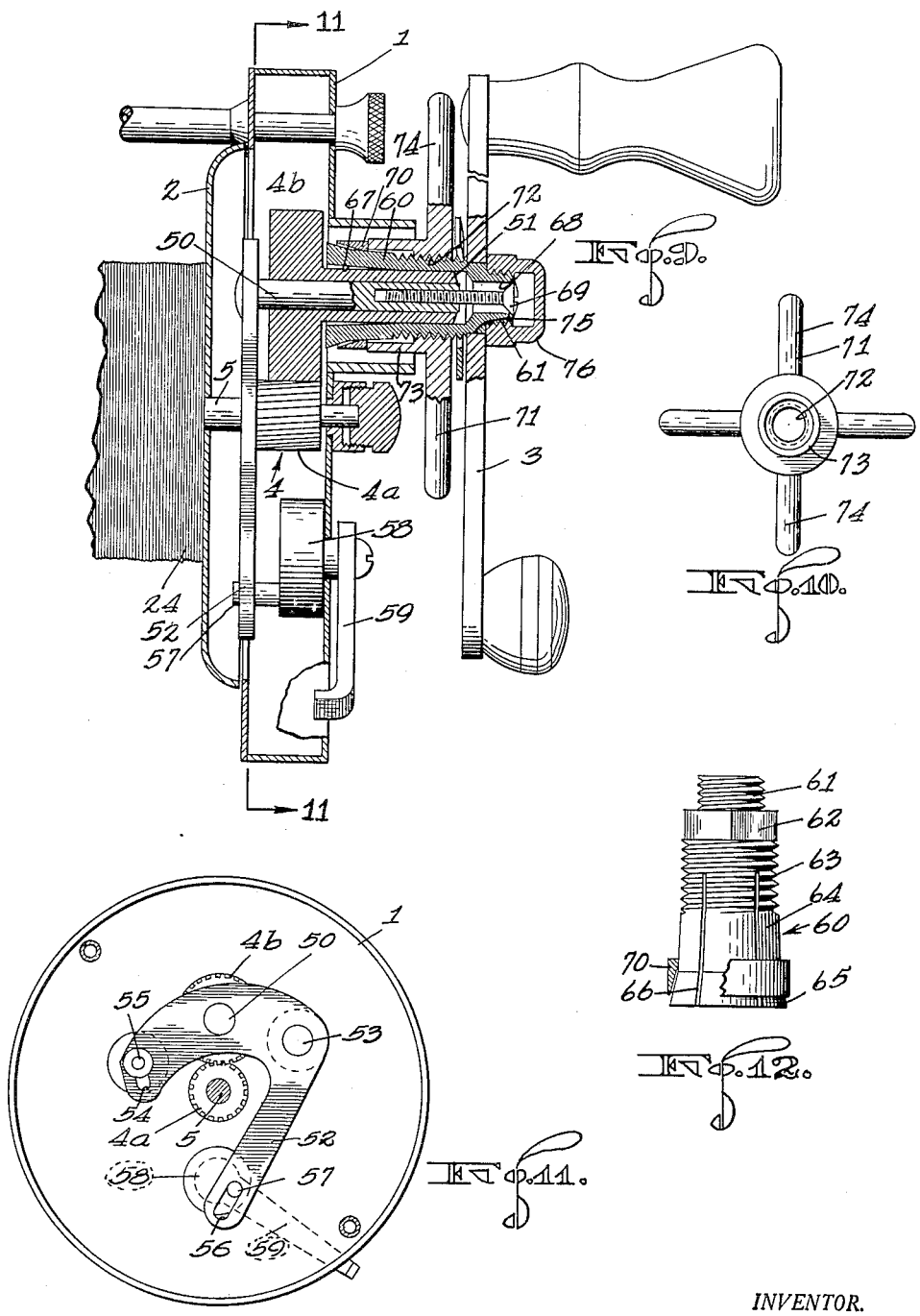

1,914,471

UNITED STATES PATENT OFFICE

JAMES F. WHITE, OF RICHMOND, CALIFORNIA, ASSIGNOR TO HENRY D. LANE, OF RICHMOND, CALIFORNIA

FISHING REEL

Application filed January 3, 1931. Serial No. 506,440.

An object of my invention is to provide an improvement in the form of fishing reel shown in my copending application, Serial No. 447,287 filed April 25, 1930. In said application I showed a reel winding spring connected to a ring shaped member, this member having an adjustable brake shoe bearing thereagainst for increasing the tension upon the ring shaped member at the will of the operator.

In the present form of the invention I connect the outer end of the reel winding spring to a heavier spring, the latter bearing against the casing with sufficient force to cause the lighter spring to wind up and exert a predetermined tension before the larger spring will slip within the casing. In this way automatic means is provided for applying the predetermined tension on the fishing line to resist the pull of the fish, the means permitting the spring to rotate in the casing when the tension on the line exceeds the predetermined point.

A further object of my invention is to provide a device of the type described which changes the manner of mounting the ratchet and spool shaft within the reel from that shown in my copending application and which makes use of a new type of drag handle.

Other objects and advantages will appear in the following specification, and the novel features of the invention will be particularly pointed out in what I hereinafter claim.

My invention is illustrated in the accompanying drawings, in which:

Figure 1 is a transverse section through the devices, portions being shown in elevation, Figure 2 is a sectional view of a portion of the device, Figure 3 is a section along the line 3—3 of Figure 1, Figure 4 shows a part of the device, Figures 5 and 6 show the spring retaining member, Figures 7 and 8 show another part of the device, Figure 9 is a vertical section showing the construction of the drag handle, parts of the device being shown in elevation, Figure 10 shows a part of the device, Figure 11 is a section along the line 11—11 of Figure 9, and Figure 12 is a side elevation of a part of the device showing a ring partly broken away.

In carrying out my invention I make use of a fishing reel having a frame 1, a spool 2, and a handle 3 operatively connected to the spool by a gearing 4. A shaft 5, see Figure 2, carries the spool 2 and has a non-circular portion 6 designed to be received within a groove 7, see Figure 7, in a tubular member 8. Figure 2 further shows the shaft 5 as having a reduced cylindrical portion 9 that is rotatably received in a bore 10 in the member 8.

The tubular member 8 has an enlarged head 11 that bears against an enlarged portion 12 of a sleeve 13, see Figure 6. The sleeve 13 is rotatably received within a bearing 14 formed in an end wall 15 of the fishing reel. The top part 16 of the member 8 is rotatably received within the bore 17 of the sleeve 13, and this part has ratchet grooves 18, see Figures 7 and 8, formed therein.

The purpose of the sleeve 13 and the member 8 is to connect and disconnect the shaft 5 with a light spring 19 at the will of the operator. The inner end of the spring 19 shown in Figure 3 is disposed in a slot 20 in the enlarged portion 12. The opposite end of the spring 19 is connected to a heavy spring 21 by rivets 22, see Figure 4, or other suitable fastening means. I have shown relatively few turns of the small spring in Figure 3, and it is obvious that as many additional turns as desired may be used.

The large spring uniformly bears against the inner surface 23, see Figure 1, of a flange 24, formed in the end wall 15.

The spring 19 is automatically connected to the spool 2 when the member 8 is moved longitudinally in the sleeve 13 so as to cause the groove 7 to receive the non-circular portion 6. The small spring 19 is tensioned when the spool 2 is rotated for unwinding the string 24 therefrom. The spring 19 will not be wound in the opposite direction when the spool 2 is rotated in the reverse direction because the ratchet teeth 18 will cause a spring pressed pin 25, see Figures 1 and 2, to ride over the teeth during this rotation. The member 8 is moved inwardly into engagement with the shaft 5 and is also moved outwardly by a screw 26 having a knurled head 27.

During the outward unwinding of the string 24, the spring 19 is tensioned until a predetermined force is exerted by the spring on the string. At this moment the tendency of the spring 19 to rotate in the end wall 19 will overcome the force the heavy spring 21 frictionally exerted against the inner wall 23, and the two springs will rotate as a unit while still exerting the same force upon the string. It will thus be seen that an automatic braking force is applied to the string as soon as a fish strikes and starts to swim away. The instant the tension on the string is released even to a slight extent, the small spring 19 will start to wind up the string on the spool 2. If desired, the fisherman can cause the gears 4 to mesh by a means not shown, and then turn the crank handle 3 for winding the string upon the spool. Of course, various tensions can be exerted upon the spool 2 to prevent its unwinding, and these tensions are arrived at by the length and the thickness of the two springs 19 and 21.

I have found that the assembly of the ratchet mechanism in the manner shown and described in the present form of the invention is simpler than that shown in my copending application.

In Figures 9 to 12 inclusive I show a novel type of drag handle to be used in connection with the reel. This handle is frictionally connected to the shaft 5, and the friction may be varied by a means hereinafter described so that the shaft can rotate with respect to the handle when a fish pulls upon the string 24 and exerts a force greater than a predetermined amount. In this way the operator can, by rotating the handle, wind up the string 24, and the fish will be pulled in unless it exerts a force so great as to cause the shaft 5 to rotate independently of the handle 3 even though the operator continues to rotate the handle for winding up the string.

The frame 1 houses the gearing 4, and this gearing consists of a gear 4a mounted on the shaft 5 and a gear 4b mounted on a stub shaft 50. The gear 4b is free to rotate on the stub shaft 50 and has an integral tubular portion 51 that extends along the shaft 50.

The shaft 50 is carried by an L-shaped frame 52, see Figure 11, which is pivoted at 53 to the frame 1. The frame 52 has a guide slot 54 therein for receiving a guide pin 55, and it also has a slot 56 in its other end for receiving a pin 57 carried by an eccentric 58. A handle 59 actuates the eccentric and moves the gear 4b into and out of mesh with the gear 4a. When the gear 4b is out of mesh with the gear 4a, the reel is said to be in free spooling position.

The crank handle 3 is frictionally connected to the gear 4b by a split sleeve indicated generally at 60 in Figure 12. This sleeve has a small threaded portion 61 at one end followed by a non-circular portion 62, and this is followed by a larger threaded portion 63, after which a smooth conical-shaped portion 64 follows, and this ends in a second conical-shaped portion 65 having a greater slant than the portion 64. The sleeve 60 is split by cuts 66 that extend through the conical portions 64 and 65 and partly into the threaded portion 63.

Figure 9 shows the bore of the sleeve 60 as being slightly conical-shaped at 67, this portion being as long as the combined lengths of the conical portions 64 and 65. The portion of the sleeve bore disposed adjacent to the threads 63 is of a size to rotatably receive the tubular portion 51 of the gear 4b. The bore of the sleeve is reduced at 68 and receives a screw 69 which is threaded into the shaft 50 for rotatably connecting the sleeve with the gear 4b and the shaft 50.

A ring 70 of the shape shown in Figure 12 is mounted upon the portion 64 and is designed to be moved toward the portion 65 for causing the split end of the sleeve 60 to clamp down upon the tubular portion 51. The ring 70 acts as a cam ring, and when moved toward the portion 65 will close the end of the split sleeve about the portion 51 so that the sleeve will frictionally engage with the portion. The conical shape of the bore 67 causes the entire surface of the bore to frictionally engage with the portion 51, and this increases the amount of contacting surface between the sleeve and the portion 51. If sufficient pressure is brought to bear on the cam ring 70, the sleeve and the portion 51 will act as a single unit.

The means for moving the cam ring 70 consists of a hand wheel 71 which has a threaded bore 72 for receiving the threads 63. The hub 73 contacts with the cam ring 70, and when the hand wheel 71 is rotated by means of the radial arms 74, see Figure 10, in the proper direction, the ring 70 will be forced toward the portion 65. Any amount of friction can be applied so that the desired braking force can be maintained between the sleeve 60 and the tubular portion 51.

The non-circular opening 75 of the crank handle 3 receives the non-circular portion 62 of the sleeve 60, and in this manner the crank handle is rigidly connected to the sleeve. A cap 76 is threaded upon the portion 61 and covers the end of the sleeve 60 and locks the crank handle 3 in place.

I have already explained how the spring 19 is automatically brought into play as soon as a fish is caught, this spring exerting a certain braking force on the string 24 before the larger spring 21 is slipped within the end wall 15. The instant the fish is caught, the operator can start actuating the crank handle 3 for winding in the string 24. He can also adjust the hand wheel 71 for creating the desired braking action between the crank handle 3 and the gear 4b. This braking action is adjusted for the size of the fish caught. If now the fish should swim away from the operator and exert a force sufficient to overcome the spring 19 and also the braking force between the crank handle 3 and the gear 4b, the string 24 would start to unwind from the reel even though the operator continued to turn the crank handle 3 for winding up the string. The moment the fish relaxes its efforts, the string would be wound upon the reel by the action of the spring 19 and also the action of the crank handle 3. There is, therefore, a direct cooperation between the automatic spring mechanism and the crank mechanism.

Although I have shown and described one embodiment of my invention, it is to be understood that the same is susceptible of various changes, and I reserve the right to employ such changes as may come within the scope of the invention as claimed.

I claim:

1. In a fishing reel, a casing, a spool, a pawl and ratchet engageable with the spool when the latter is rotated in one direction, a light spring connected to the pawl and ratchet, and a heavy spring connected to the light spring and yieldingly engaging with the casing, said heavy spring slipping in the casing when the light spring has been placed under sufficient tension to exert a braking force on the spool.

2. In a fishing reel, a casing, a spool, a pawl and ratchet engageable with the spool when the latter is rotated in one direction, a light spring connected to the pawl and ratchet, and a heavy spring connected to the light spring and yieldingly engaging with the casing, said heavy spring slipping in the casing when the light spring has been placed under sufficient tension to exert a braking force on the spool, and means for disconnecting the pawl and ratchet from the spool for permitting free rotation of the spool in either direction.

3. In a fishing reel, a spool shaft having a non-circular portion, a ratchet rotatably supporting the shaft and being slidable longitudinally for engagement with the non-circular portion, a pawl carrying member encircling the ratchet, a spring pressed pawl, a braking spring connected to the pawl carrying member, and a handle secured to the outer end of the ratchet for moving it longitudinally.

4. A fishing reel comprising a casing, a spool carried thereby, a normally untensioned spring connected to the spool and being placed under tension when the spool is rotated for unwinding a line from the spool, said spring slipping within the casing after exerting a predetermined braking action on the spool, a crank handle, adjustable friction means connecting the handle with the spool, whereby the spool can be rotated by the unwinding of the string when sufficient force is exerted to overcome the spring and the friction connection between the handle and the spool.

5. In combination, a spool, a shaft operatively connected to the spool, a split sleeve enclosing the shaft, a crank handle connected to the sleeve, and adjustable means including a manually-actuated member mounted on the sleeve for causing the split portions of the sleeve to move towards the shaft and frictionally engage with the shaft.

6. In combination, a spool, a shaft operatively connected to the spool, a split sleeve enclosing the shaft, a crank handle connected to the sleeve, and adjustable means for causing the sleeve to frictionally engage with the shaft, the inner surfaces of the split portion of the sleeve being inclined.

7. In combination, a spool, a shaft operatively connected to the spool, a split sleeve enclosing the shaft, a crank handle connected to the sleeve, adjustable means for causing the sleeve to frictionally engage with the shaft, said means comprising a hand wheel threaded on the split sleeve, and a cam ring moved by the hand wheel into engagement with the split portions of the ring for causing the latter to frictionally engage with the shaft.

8. In combination, a shaft, a split sleeve rotatably mounted thereon and having the inner surfaces of the split portions inclined, a cam ring mounted on the split sleeve, a hand wheel threaded on the sleeve and bearing against the cam ring, a crank handle connected to the sleeve, a screw securing the sleeve to the shaft, but permitting rotation between them, and a cap threaded on the sleeve and securing the handle in place.

JAMES F. WHITE.